US011384415B2

(12) United States Patent
Grosse-Heilmann et al.

(10) Patent No.: US 11,384,415 B2
(45) Date of Patent: Jul. 12, 2022

(54) STEEL ALLOY WITH HIGH ENERGY ABSORPTION CAPACITY AND TUBULAR STEEL PRODUCT

(71) Applicant: Benteler Steel/Tube GmbH, Paderborn (DE)

(72) Inventors: Niko Grosse-Heilmann, Harsewinkel (DE); Andreas Peters, Leipzig (DE); Isabella-Maria Zylla, Münster (DE); Ernst Kozeschnik, Vienna (AT); Michael Kaufmann, Paderborn (DE); Jozef Balun, Schlangen (DE)

(73) Assignee: Benteler Steel/Tube GmbH, Paderborn (DE)

( * ) Notice: Subject to any disclaimer, the term of this patent is extended or adjusted under 35 U.S.C. 154(b) by 684 days.

(21) Appl. No.: 15/776,679

(22) PCT Filed: Nov. 16, 2016

(86) PCT No.: PCT/EP2016/077878
§ 371 (c)(1),
(2) Date: May 16, 2018

(87) PCT Pub. No.: WO2017/085135
PCT Pub. Date: May 26, 2017

(65) Prior Publication Data
US 2020/0255926 A1 Aug. 13, 2020

(30) Foreign Application Priority Data

Nov. 16, 2015 (DE) .................... 10 2015 119 794.4
Nov. 17, 2015 (DE) .................... 10 2015 119 839.8

(51) Int. Cl.
*C22C 38/28* (2006.01)
*C22C 38/26* (2006.01)
(Continued)

(52) U.S. Cl.
CPC .............. *C22C 38/28* (2013.01); *B62D 21/15* (2013.01); *C21D 6/002* (2013.01); *C21D 6/005* (2013.01);
(Continued)

(58) Field of Classification Search
None
See application file for complete search history.

(56) References Cited

U.S. PATENT DOCUMENTS 5,695,576 A     12/1997  Beguinot
7,192,656 B1 *   3/2007  Tai ........................... C25D 5/02
                                                        148/533

(Continued)

FOREIGN PATENT DOCUMENTS

CN      102884218       1/2013
CN      104498821       4/2015
(Continued)

OTHER PUBLICATIONS

Responsible Care—A New Strategy for Pollution Prevention and Waste Reduction through Environmental Management, by Nicholas P. Cheremisinoff et al., Gulf Publishing Company, 2008, p. 439 (Year: 2008).*

*Primary Examiner* — Anthony M Liang
(74) *Attorney, Agent, or Firm* — Pandiscio & Pandiscio

(57) ABSTRACT

The present invention relates to a steel alloy with high energy absorption capacity and good formability, comprising beside inevitable impurities due to smelting and iron the following components in weight percent:
C 0.05-0.6%
Sum of Cr+2*Ti+3*(Mo+V+Nb)+4*W=2-7%,
wherein the structure of the steel alloy comprises beside martensite portions of 10-40 Vol.-% retained austenite, wherein the energy absorption capacity expressed by the product of tensile strength (Rm) and uniform strain (Ag) is
(Continued)

higher than 12,000 MPa % and the steel alloy has a minimal tensile strength of 1000 MPa.

In addition, the invention relates to a steel tube product with high energy absorption capacity and good formability, which is characterized in that it at least partially consists of such a steel alloy.

11 Claims, 4 Drawing Sheets

(51) Int. Cl.

| | | |
|---|---|---|
| C22C 38/24 | (2006.01) | |
| C22C 38/22 | (2006.01) | |
| C22C 38/02 | (2006.01) | |
| C22C 38/04 | (2006.01) | |
| C21D 9/14 | (2006.01) | |
| C21D 8/10 | (2006.01) | |
| C21D 6/00 | (2006.01) | |
| B62D 21/15 | (2006.01) | |
| E21B 17/00 | (2006.01) | |

(52) U.S. Cl.
CPC ............ *C21D 6/008* (2013.01); *C21D 8/105* (2013.01); *C21D 9/14* (2013.01); *C22C 38/02* (2013.01); *C22C 38/04* (2013.01); *C22C 38/22* (2013.01); *C22C 38/24* (2013.01); *C22C 38/26* (2013.01); *E21B 17/00* (2013.01); *C21D 2211/001* (2013.01); *C21D 2211/008* (2013.01)

(56) References Cited

U.S. PATENT DOCUMENTS

| | | | |
|---|---|---|---|
| 2002/0017214 A1* | 2/2002 | Jacoby | .................... F42B 1/028 |
| | | | 102/307 |
| 2006/0137769 A1 | 6/2006 | Yuse et al. | |
| 2006/0162825 A1 | 7/2006 | Beguinot et al. | |
| 2007/0079912 A1 | 4/2007 | Beguinot | |
| 2013/0087257 A1* | 4/2013 | Yoshino | ................. C21D 8/005 |
| | | | 148/648 |
| 2014/0205855 A1 | 7/2014 | Kawata et al. | |

FOREIGN PATENT DOCUMENTS

| | | |
|---|---|---|
| DE | 69613868 | 11/2001 |
| DE | 102007030207 | 1/2009 |
| DE | 102012003791 | 8/2013 |
| EP | 1154028 | 11/2001 |
| EP | 1881083 | 1/2008 |
| EP | 1961832 | 8/2008 |
| EP | 2009120 | 12/2008 |
| EP | 2312008 | 4/2011 |
| JP | S62-74056 | 4/1987 |
| JP | 2004-76034 | 3/2004 |
| JP | 2005105357 | 4/2005 |
| JP | 2006-183137 | 7/2006 |
| JP | 2010209402 | 9/2010 |
| JP | 2011-184756 | 9/2011 |
| JP | 2014001436 | 1/2014 |
| WO | WO 2012/156428 | 11/2012 |
| WO | WO 2014/016421 | 1/2014 |
| WO | WO 2014/040585 | 3/2014 |
| WO | WO 2014/095082 | 6/2014 |

* cited by examiner

STEEL ALLOY WITH HIGH ENERGY ABSORPTION CAPACITY AND TUBULAR STEEL PRODUCT

REFERENCE TO PENDING PRIOR PATENT APPLICATIONS

This patent application claims benefit of International (PCT) Patent Application No. PCT/EP2016/077878, filed 16 Nov. 2016 by Benteler Steel/Tube GmbH for STEEL ALLOY WITH HIGH ENERGY ABSORPTION CAPACITY AND TUBULAR STEEL PRODUCT, which claims benefit of: (i) German Patent Application No. DE 10 2015 119 794.4, filed 16 Nov. 2015 and (ii) German Patent Application No. DE 10 2015 119 839.8, filed 17 Nov. 2015, which patent applications are hereby incorporated herein by reference.

FIELD OF THE INVENTION

The present invention relates to a steel alloy with high energy absorption capacity as well as to a steel tube product.

BACKGROUND OF THE INVENTION

It is known for manufacturing of, for example, motor vehicle components to use so-called TRIP (Transformation Induced Plasticity) steels. TRIP-steels in general consist of ferrite, bainite and retained austenite, which induced by deformation transforms into martensite. The deformation induced martensitic transformation of the retained austenite is also referred to as TRIP-effect.

For stabilizing the retained austenite and for increasing the TRIP-effect, it is known to subject TRIP-steels to a heat treatment. In particular, a so-called quenching and partitioning (Q&P) is used. With this method, a structure with tempered martensite with embedded retained austenite is set.

Therein, the martensite increases the strength and the retained austenite ensures due to the TRIP-effect additionally good strain properties.

A disadvantage of low-alloy martensitic/austenitic steels is that the formation of bainite and/or cementite (iron carbide) must be prevented in order to obtain a sufficient portion of retained austenite in the steel. From the prior art it is known, for example, to add silicon for suppressing the formation of bainite and cementite in large quantities. A disadvantage of this kind of suppression of bainite formation and cementite formation is that the addition of silicon degrades the surface quality of the steel product during hot forming. In addition, in these martensitic/austenitic steels, in general significant portions of bainite and cementite and thus insufficient austenite stabilization are observed.

SUMMARY OF THE INVENTION

The object of the present invention is thus to provide a solution, by means of which the energy absorption capacity and the formability of a steel can be improved in a simple and reliable manner.

The invention is based on the finding that this object can be achieved by adding carbide-forming elements to the steel alloy.

According to the invention the object is thus achieved by a steel alloy with high energy absorption capability and good formability, which beside inevitable impurities due to smelting and iron comprises the following components in weight percent:

C 0.05-0.6%
Sum of $Cr+2*Ti+3*(Mo+V+Nb)+4*W=2-7\%$,
wherein the structure of the steel alloy contains beside martensite portions of 10-40 Vol.-% of retained austenite, wherein the energy absorption capacity expressed by the product of tensile strength Rm and uniform strain Ag is more than 14,000 MPa % and the steel alloy has a minimum tensile strength of 1,000 MPa The present invention thus provides a low-alloy steel alloy which has a high energy absorption capacity and good formability. The steel alloy will hereinafter also be referred to as alloy, steel or material. Indications of content of alloying elements are given as weight percent but may be referred to only as percent.

Carbon (C) is required for the production of martensitic/austenitic structure. According to the invention carbon is added in an amount of at least 0.05%. It has been found that with a carbon content of less than 0.05%, not enough carbon is present in the steel to achieve significant retained austenite stabilization. However, the carbon content is limited according to the invention to a maximum of 0.6%. Above 0.6% the martensitic matrix of the material, in particular of the final material after tempering at relatively low temperatures is too brittle to represent a technically usable material. According to the invention the carbon content of the steel alloy is in a range of 0.05% to 0.6% and preferably in a range between 0.1-0.6% and further preferred in the range between 0.15 and 0.5%.

According to the invention, the steel alloy additionally comprises at least one carbide-forming element. In particular alloying elements, which form carbides with carbon are referred to as carbide-forming elements. The formation of iron carbide ($Fe_3C$ cementite) is thereby suppressed.

Particularly preferably, the steel alloy contains chromium. Chromium serves as carbide-forming element. In addition to chromium the steel alloy may also contain one or more further carbide-forming elements.

Alloying elements of the subgroup 4 (titanium group), 5 (vanadium group) and 6 (chromium group) of the periodic table can be used as carbide-forming elements.

Carbide-forming elements are generally considered to counteract against the stabilization of the retained austenite, since they use the carbon to form the carbides, which would be necessary for stabilization in the retained austenite. According to the invention, however, it has been found that by targeted addition of carbide-forming elements the amount of retained austenite in the steel can be increased.

When adding carbide-forming elements to iron-carbon alloys, at temperatures above the start temperature of the intermediate structure, bainite, which is also referred to as Bs (bainite start temperature), an area exists in which no transformations occur. In the time-temperature-transformation diagram this is apparent by a complete separation of the transformation areas for ferrite/pearlite and bainite. This area, in which no transformations occur, is internationally also referred to as bay. It has proven, that both the undesirable bainite formation and the cementite formation are impeded at these temperatures, if carbide-forming elements are added in a targeted manner.

According to the invention, therefore bay-forming elements, that means carbide-forming elements, are added. In particular, chromium is added as carbide-forming element. Preferably, the chromium content is in the range of 2-7, preferably 2.5 to 7 or in the range of 2-4% and particularly preferably at 3%.

In addition to chromium in particular molybdenum is added. Chromium and molybdenum suppress the formation of bainite and thus allow for a redistribution of carbon in the retained austenite.

In addition, according to the invention at least one further carbide-forming element can be added. The carbide-forming elements according to the invention are the elements Ti (subgroup 4), V, Nb (subgroup 5) as well as Cr, Mo, W (subgroup 6). These alloying elements are important for use in steelmaking from an economic point of view. These alloying elements which serve as carbide-forming elements show a differently strong effect as bay-forming elements. In descending order W, Mo, V, Nb and Ti are suitable as bay-forming elements beside chromium. These alloying elements are added according to the invention in such a combination, that the requirement:
Cr+2*Ti+3*(Mo+V+Nb)+4*W=2-7%
is satisfied.

In this way, the bay area is reliably enlarged and a temperature control for achieving a higher proportion of retained austenite is simplified.

Particularly preferably, the carbide-forming elements in the steel alloy satisfy the requirement, that the sum of Cr+2*Ti+3*(Mo+V+Nb)+4*W is in the range of 2-7% and preferably is at least 2.2, 2.5, 3 or 3.5. Preferably the sum has a maximal value of 6. Thereby, the bainite formation and cementite formation can be reliably prevented and a structure can be produced wherein the proportion of retained austenite is high.

In the steel alloy according to the invention manganese (Mn) can be present. The addition of manganese is not mandatorily required. If manganese is added, the manganese content is preferably less than 1.5% and particularly preferably less than 1%. The manganese content can be, for example, in the range of 0.5-0.7%, for example at 0.65%.

According to the invention, the structure of the steel alloy contains beside martensite portions of 10-40 Vol.-% retained austenite. The minimal content of retained austenite is preferably 20 Vol. %. According to a preferred embodiment, the structure of the steel alloy contains beside martensite portions of 15-35 Vol.-% and particularly preferably 20 to 35 Vol.-% retained austenite. With this high portion of retained austenite in the martensitic matrix the TRIP-effect can particularly be used and thereby the advantageous material properties can be achieved.

Even though it is not preferred, in addition to the martensitic structure with retained austenite, also a minor portion of bainite can be present in the structure of the steel alloy. The bainite portion, however, is limited to a maximum of 30 Vol.-%. With this bainite portion still a sufficient content of retained austenite can be achieved in the martensitic structure.

The energy absorption capacity of the steel alloy according to the invention, expressed by the product of tensile strength (Rm) and uniform strain (Ag) according to the invention is higher than 12,000 MPa % and according to the invention may also be higher than 14,000 MPa %.

Also the product of yield strength and fracture strain as well as the product of tensile strength and fracture strain can be higher with the steel alloy according to the invention than with known steels.

In addition, according to the invention the product of tensile strength (Rm) and fracture strain (A5) of the steel alloy according to the invention, is high enough that the formability, in particular the cold workability, of a steel product produced from the steel alloy is ensured.

The steel alloy according to the invention has a minimal tensile strength of 1,000 MPa.

The steel alloy according to the invention is therefore superior to conventional heat-treatment steel in terms of formability and fracture strain with the same tensile strength.

According to one embodiment, the steel alloy has a silicon content of less than 1.1%. Due to its high oxygen affinity silicon can be used as deoxidizer and is therefore present in most killed steel alloys. In low-alloy steels silicon is known for suppressing cementite formation in steels. However, it has been found that silicon-alloyed steels with increasing content tend to form more adherent oxide layers which degrades the surface quality, which has in particular disadvantageous effects to subsequent coating processes, such as galvanizing.

By limiting the silicon content to 1.1% in the steel alloy according to the invention the negative influences of silicon on the properties of the steel, in particular the poor surface properties, can be minimized.

According to one embodiment, the yield strength ratio (yield strength to tensile strength) Rp0.2/Rm of the steel alloy is ≤0.8. With conventional heat-treatment steels this ratio is higher, for example at >0.9. With the present steel alloy, therefore, a better formability of the steel product which is produced from the steel alloy, in particular steel tube product, can be ensured.

The uniform strain (Ag) of the steel alloy according to the invention can be ≥5%. With conventional heat-treatment steels, in particular steels with more than 1,000 MPa, the uniform strain is lower and is in particular at <5%.

According to a preferred embodiment, the steel alloy is in a heat-treated state, in particular in a state after heat treatment of quenching and partitioning (Q&P).

According to the invention, it has proven that steels which are alloyed with carbide-forming elements, in particular chromium, but also titanium, molybdenum, vanadium, niobium and tungsten are outstandingly suitable for the quenching & partitioning heat treatment. This finding contrasts with the prior art opinion that the carbide-forming elements are generally counterproductive for Q & P.

A "quenching and partitioning" heat treatment (Q&P) produces a two-phase microstructure which consist of low-carbon martensite and retained austenite.

During the quenching step, the steel is first fully austenitized and then quenched to a temperature which is between the martensite start temperature and the martensite end temperature. Due to the suppressed cementite precipitation, the carbon diffuses during the partitioning step from the supersaturated martensite to the retained austenite. Carbon stabilizes the austenite, whereby the martensite start temperature of the carbon enriched austenite is locally lowered to below room temperature. Therefore in a final quenching to room temperature no high carbon containing martensite is formed and austenite which is enriched with carbon remains. The martensite which is preferably tempered increases the strength and the retained austenite due to the TRIP-effect ensures still good strain properties.

According to one example the product from the steel alloy, for example a tube element, is subjected to the following process steps:
 a. Quenching after the hot forming at least Ac3 temperature first in a first cooling step with a cooling rate higher than the critical cooling speed to T1 larger than Ms.
 b. Quenching in a second cooling step to a temperature T2
  a. Wherein T2<Ms−50° C. and higher than room temperature;

b. And the second cooling step is carried out with a cooling rate which is lower by a factor of 3 to 20 in comparison to the first cooling step
c. Heating with a heating rate and holding phase for stabilizing polyhedronal retained austenite which satisfies the following equation:

$$(T3-T2)/10 \times \text{heating rate in K/s} > \text{holding time (in sec.) at } T3$$

Wherein T3>bainite start temperature
d. Further cooling step to a tube temperature <Ms.

Herein step c is the step of partitioning. The longer the re-heating (heating rate) takes, the shorter the holding time for the partitioning. At a moderate heating rate of, for example, 10 K/s with inductive heating and a temperature difference (dT) of 200 K, the holding time is thus <200 s.

The heat treatment, in particular the step of partitioning according to the invention is preferably carried out with inductive heating. Thereby, the desired heating rate and holding phases can be specifically set.

The steel alloy according to the invention, in addition to the high energy absorption capacity and the good formability also has a good machinability. The machinability, that means the property to be ability to machine the steel product which produced from the steel alloy, is mainly determined by the strength and toughness. With the strength and toughness which can be achieved according to the invention the machinability of the steel alloy, in particular of the product which is produced from the steel alloy can be ensured.

With the steel alloy according to the invention different steel products can be manufactured. Preferably the steel alloy according to the invention is used to manufacture a steel tube product.

According to a further aspect the present invention thus relates to a steel tube product with high energy absorption capacity and good formability. The steel tube product is characterized in that it at least partially consists of the steel alloy according to the invention. Particularly preferably, the steel tube product comprises a tuber element, which at least partially and preferably entirely consists of the steel alloy according to the invention. Alternatively it is also possible that the steel tube product consists exclusively of such a tube element.

In the oil industry, a steel tube product of the present invention can be used, for example, as a drill tube or a so-called perforation gun.

Thus according to one embodiment, the steel tube product forms at least part of a perforation gun. In particular the steel tube product can be the hollow carrier of a perforation gun. The perforation gun is a unit which is used in the oil extraction industry. The perforation gun is therein used to open or re-open drill holes to access gas reservoir or crude oil reservoir. A perforation gun preferably comprises a hollow carrier. Ignition units are inserted into the hollow carrier. While the perforation gun is brought into position, for example, is brought into a depth in which an oil reservoir is located and is positioned relative thereto, the hollow carrier must withstand high mechanical stresses, in particular due to the prevailing pressure and the elevated temperature. A hollow carrier produced from the steel alloy according to the invention can suffice these requirements.

The steel tube product, which is at least a part of a perforation gun, in particular a hollow carrier, has a plurality of, in particular locally limited, sections of reduced wall thickness. These locally limited sections are preferably punctiform or circular sections. The sections are provided in the hollow carrier for forming wall openings at the hollow carrier upon ignition of ignition charges which are inserted into the hollow carrier. Due to the high energy absorption capacity of the steel alloy of the invention, from which the hollow carrier preferably consists, it can be ensured that upon ignition of the ignition charges the hollow carrier does not burst. Only the areas of reduced wall thickness are destroyed, thus allowing the perforation of the surrounding rock.

According to a further example, the steel tube product is at least a part of a drill tube, in particular drill pipe for OCTG (Oilfield and Country Tubular Goods). These are used, for example, for drilling for oil, gas or water. The steel alloy which is used according to the invention is especially suitable for this application, since the steel tube product which is made from this steel alloy, can sustain the high loads which are present at exploration drillings.

According to a further example, the steel tube product is at least a part of a mineralogical drill tube. These are used, for example, for the implementation of infrastructure measures such as the building of telecommunication and power lines or the geothermy. The steel alloy which is used according to the invention is especially suitable for this application, since the steel tube product which is made of this steel alloy can withstand the different geological formations well.

The provision of sections with reduced wall thickness is possible with the steel alloy according to the invention in a simple manner, since with it a good machinability is given.

According to an alternative embodiment, the steel tube product is a steel tube product for a motor vehicle with high energy absorption capacity.

The steel tube product in this embodiment, for example, can be a shaft, a stabilizer, an injection pipe or can be used in an impact protection unit such as an airbag module, a door impact beam, a roll bar or an A-pillar.

According to one embodiment, the steel tube product forms at least a part of an airbag gas pressure vessel. As airbag gas pressure vessel a part of an airbag module is referred to within which medium, in particular gas, is stored under elevated pressure or within which a high pressure of the medium is generated. The actual airbag is filled by means of the medium. In the embodiment as an airbag gas pressure vessel, the steel tube product has at least two longitudinal sections of different outer circumference. In particular, at least one of the tube ends can have a smaller outer circumference. The outer circumference of a longitudinal section in this embodiment is preferably at least 5 percent smaller than the outer circumference of the further longitudinal section.

According to a preferred embodiment, the steel alloy in the steel tube product has volume-related portions of 10-40%, preferably 15-35% and particularly preferably 20 to 35% of film- or polyhedron-shaped retained austenite. According to a preferred embodiment the retained austenite is predominantly present as polyhedron-shaped retained austenite. Thereby it is in particular possible to use the TRIP-effect also at room temperature.

According to a further embodiment the steel tube product has a metallic coating which protects against corrosion at least at its outer surface, at least in the area in which it is formed by the steel alloy of the invention. The metallic corrosion protection layer, for example, can be a zinc layer which is applied by galvanizing. Such kind of coating is possible when using the steel alloy according to the invention, since its surface property can be improved due to the possible low silicon content.

According to a further embodiment the steel tube product is used for crash-relevant structural components, chassis components, shafts or airbag gas pressure vessels of a motor vehicle.

According to the invention the steel tube product and in particular the part of the steel tube product, which is made of the steel alloy of the invention, is heat treated, in particular treated by a quenching and partitioning heat treatment.

By this heat treatment, the retained austenite, which is formed with the alloy according to the invention in a large amount, can be stabilized and the desired product properties can be set specifically.

BRIEF DESCRIPTION OF THE DRAWINGS

In the enclosed figures, embodiments of steel tube products according to the present invention are schematically shown. Herein shows.

DETAILED DESCRIPTION OF THE PREFERRED EMBODIMENTS

Figure 1:
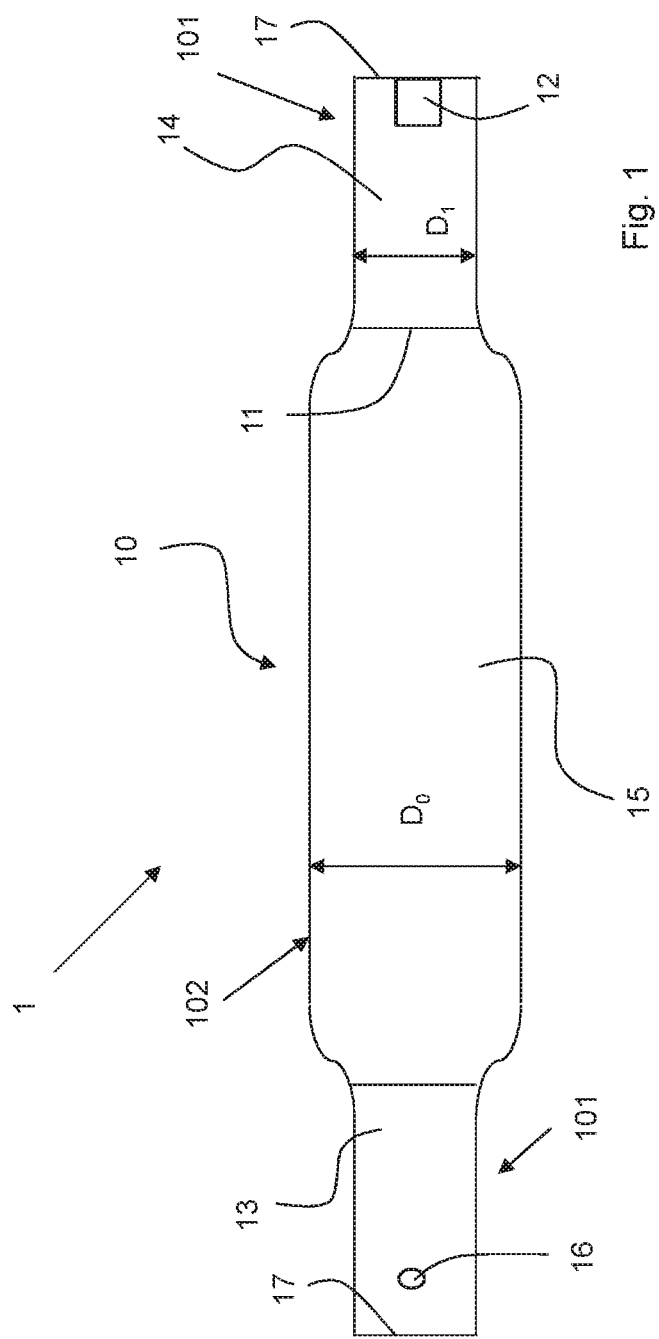
FIG. 1: a schematic depiction of a steel tube product in the embodiment as airbag gas pressure vessel.

In FIG. 1 an embodiment of the steel tube product 1 according to the invention as gas pressure vessel, in particular airbag gas pressure vessel, is shown. The steel tube product 1 comprises a tube element 10. In the embodiment shown in FIG. 1 the tube ends 101 are tapered or pulled in. The taper of the tube ends 101 can be produced by cold forming. The tube ends 101 in the depicted embodiment each have a diameter $D_1$ which is smaller than the diameter $D_0$ of the tube element 10 in its central area 102. The diameter of the tube ends 101 can also be different. In the embodiment shown in FIG. 1 the steel tube product 1 has a combustion chamber 4, in which an igniter 12 as well as the further pyrotechnical components are provided. At the one tube end 101 the combustion chamber 14 is closed by a disc 17 which is welded thereto. To the combustion chamber 14 the cold gas storage 15 follows. This is separated from the combustion chamber 14 by the membrane 11, which can also be referred to as burst disc. The cold gas storage 15 is in the central area 102 of the tube element 10, which has the larger diameter $D_0$. The cold gas storage 15 is followed by the Diffusor 13. In FIG. 1 a filling hole 16 is shown in the area of the diffusor 13. The tube end 101 of the diffusor 13 is welded with a disc 17, that means is closed thereby.

In the cold gas storage 15, for example, a pressure of 580 bar may prevail. In the combustion chamber 14 the pressure may increase, for example, from 580 bar to 1,200 bar upon ignition of the igniter. The steel tube product 1 according to the invention can reliably withstand this pressure due to its properties without having to fear brittle fracture or expansion of a brittle crack.

Figure 2:
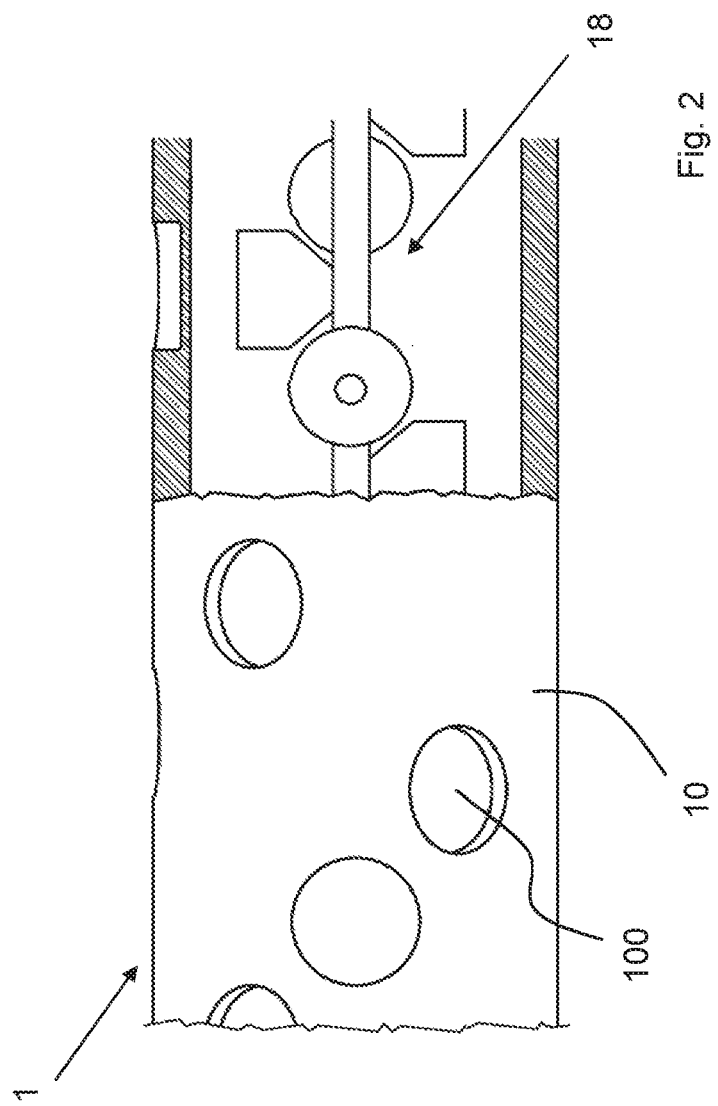
FIG. 2: a schematic depiction of a steel tube product in the embodiment as hollow carrier of a perforation gun.

FIG. 2 shows a schematic view of a further embodiment of the steel tube product 1, which is a perforation gun. The perforation gun 1 comprises a tube element 10, which can also be referred to as hollow carrier. The tube element 10 is preferably a seamless tube element. In the tube element 10 locally limited areas 100 with a reduced wall thickness are provided. The locally limited areas 100 each have a circular area. The areas 100 are distributed over the length of the tube element 10. In the tube element 10 an ignition unit 18 with ignition charges is inserted. The explosive material of the ignition charge is ignited by the ignition unit 18 and thereby on the one hand the areas 100 of the tube element 10 are opened and on the other hand the surrounding material, for example rock, is perforated.

Figure 3:
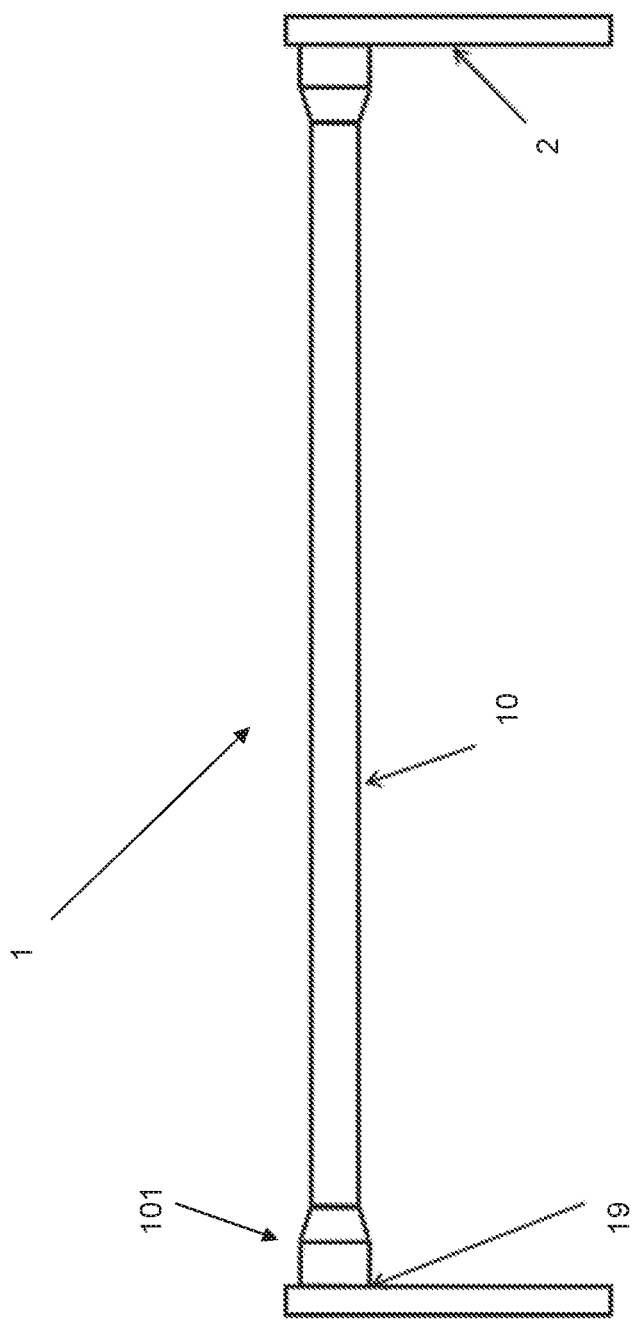
FIG. 3: a schematic depiction of a steel tube product in an embodiment as stabilizer.

In FIG. 3 a further embodiment the steel tube product 1 is shown. In this embodiment the steel tube product 1 is a stabilizer. The stabilizer 1 comprises in the depicted embodiment a tube element 10, the ends 101 of which each are attached to a connection component 2. As can be derived from FIG. 3, the tube ends 101 are connected to the connection components 2 via a connection point 19, for example by a welding seam.

Figure 4:
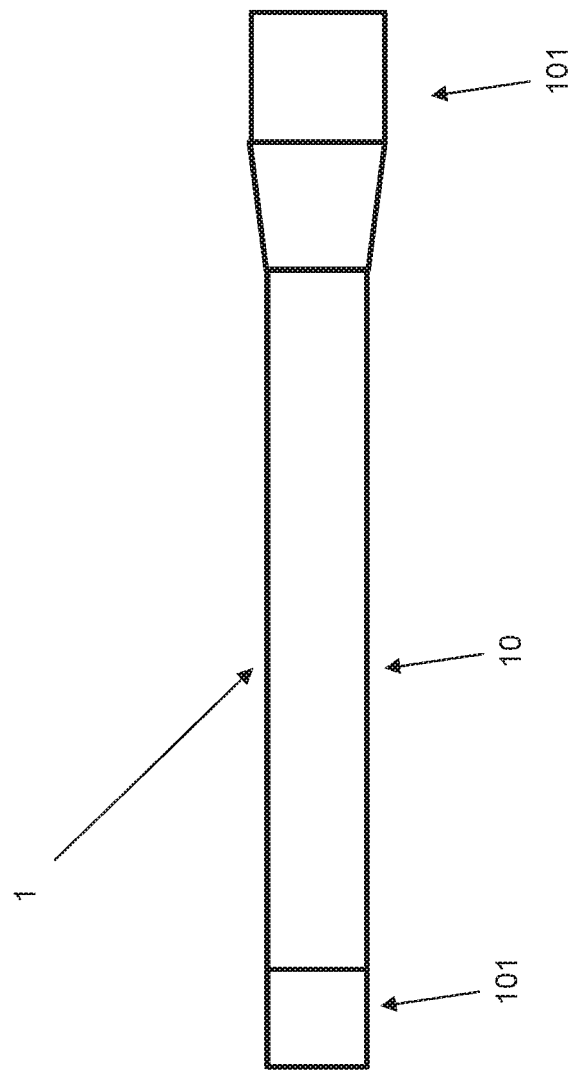
FIG. 4: a schematic depiction of a steel tube product in an embodiment as drill tube.

In FIG. 4 a further embodiment of the steel tube product 1 is shown. In this embodiment, the steel tube product 1 is a drill tube, in particular a drill pipe. The drill tube 1 comprises in the depicted embodiment a tube element 10, at the tube ends 101 of which threads are provided. As shown at the left tube end 101, this thread can be an external thread or as shown at the right tube end 101 be an internal thread, which is provided into the widened tube end 101. However, also other shapes of drill tubes can be used. For example, at one of the tube ends 101 drilling projections or knives can be provided. Via the thread several tube elements 10 can be attached to each other and thus a long drill tube 1 can be build.

With the present invention a number of unexpected advantages can be achieved. On the one hand by alloying of carbide-forming elements according to the invention, which according to general understanding should further reduce the austenite content to be expected by the expected carbide formation, and a temperature control, which contrary to expectation specifically suppresses bainite formation and carbide formation, the austenite content is significantly increased. The increased usage of silicon, which leads to worse surfaces in the hot forming, can be omitted according to the invention.

With the present invention thus a novel material group of the high strength Q&P steels is provided, which excellently can be used for tubes. In particular steel products, in particular tubes, can be manufactured, which have a high strength with simultaneous high ductility. In particular the steel products according to the invention have a higher energy absorption capacity compared to conventional heat treatment tubes. Due to the low yield strength ratio of the steel alloy a better formability is achieved. Due to the low content or the absence of silicon in the steel alloy a better surface quality of the steel product is achieved. In particular, with the steel alloy according to the invention also after hot working a coating of the surface, for example galvanizing, is possible.

Finally due to the low proportion of alloying elements the costs for the steel alloy are low.

REFERENCE NUMBERS

1 steel tube product
10 tube element
101 tube end
102 central area
11 membrane
12 igniter
13 diffusor
14 combustion chamber 15 cold gas storage
16 filling hole
17 disc
100 area of reduced wall thickness
18 ignition unit
19 connection point
2 connection component

The invention claimed is:

1. Steel tube product with high energy absorption capacity, characterized in that it at least partially comprises a steel alloy with high energy absorption capacity, comprising, besides inevitable impurities and iron, the following components in weight percent:

C 0.05-0.6%
Sum of Cr+2*Ti+3*(Mo+V+Nb)+4*W=2–7%,
   wherein the structure of the steel alloy comprises besides martensite 10-40 Vol.-% retained austenite,
   wherein the energy absorption capacity expressed by the product of tensile strength (Rm) and uniform strain (Ag) is higher than 12,000 MPa % and the steel alloy has a minimal tensile strength of 1,000 MPa;
   wherein the chromium content is in the range from 2-7%; and
   wherein the steel tube product is heat treated by a quenching and partitioning heat treatment.

2. Steel tube product according to claim 1, characterized in that the steel tube product forms at least a part of a perforation gun, wherein the steel tube product has a plurality of locally limited sections of reduced wall thickness.

3. Steel tube product according to claim 1, characterized in that the steel tube product forms at least a part of a drill tube.

4. Steel tube product according to claim 1, characterized in that the steel tube product is a steel tube product for a motor vehicle.

5. Steel tube product according to claim 1, characterized in that the steel tube product forms at least a part of an airbag gas pressure vessel with at least two longitudinal sections of different outer circumference, wherein the outer circumference of a longitudinal section is smaller by at least 5 percent than the outer circumference of at least one of the other longitudinal sections.

6. Steel tube product according to claim 1, characterized in that the steel tube product contains 10-40 Vol.-% retained austenite of film-shaped or polyhedron-shaped retained austenite.

7. Steel tube product according to claim 1, characterized in that the structure has 15-35 Vol.-% retained austenite.

8. Steel tube product according to claim 1, characterized in that the steel tube product has a metallic coating which protects against corrosion at least at its outer surface.

9. Steel tube product according to claim 1, characterized in that the steel tube product is at least a part of a structural component of a motor vehicle.

10. Steel tube product according to claim 6, characterized in that the 10-40 Vol.-% retained austenite consists of polyhedron-shaped retained austenite.

11. Steel tube product according to claim 7, characterized in that the structure contains 20 to 35 Vol.-% retained austenite.

* * * * *